United States Patent
McBurney

[19]

[11] Patent Number: 6,150,978
[45] Date of Patent: Nov. 21, 2000

[54] GPS RECEIVER HAVING FAST RESOLUTION OF CARRIER PHASE AMBIGUITY

[75] Inventor: Paul W. McBurney, Santa Clara, Calif.

[73] Assignee: Trimble Navigation Limited, Sunnyvale, Calif.

[21] Appl. No.: 09/203,538

[22] Filed: Dec. 2, 1998

Related U.S. Application Data

[62] Division of application No. 08/985,476, Dec. 5, 1997, Pat. No. 5,847,680.

[51] Int. Cl.[7] .......................... H04B 7/185; H04L 27/14
[52] U.S. Cl. ...................................... 342/357.04; 375/326
[58] Field of Search .................. 342/357.04, 357.06; 375/326

[56] References Cited

U.S. PATENT DOCUMENTS 5,025,455   6/1991   Nguyen .................................. 375/327

OTHER PUBLICATIONS

McGuffin et al, "I/Q Channel Reversal Correcting Properties of an SQPSK Costas Loop With Integrated Symbol Synchronization", IEEE Trans. on Comm., vol. 36, No. 9, Sep. 1988, pp. 1082–1086.

Euler, Hans–Jurgen, "Achieving High Accuracy Relative Positioning in Real–time System Design, Performance and Real–time Results", 1994 IEEE Plans, Apr. 11–15, 1994, pp. 540–546.

Park, Chansik et al, "Efficeint Ambiguity Resolution Using Constraint Equation", 1996 IEEE Plans, Apr. 22–26, 1996, pp. 277–284.

Primary Examiner—Gregory C. Issing
Attorney, Agent, or Firm—Menlo Patent Agency LLC

[57] ABSTRACT

A carrier ambiguity detector for resolving a ½cycle carrier phase ambiguity in an incoming GPS signal before the arrival of the next preamble by detecting a match or an inverted match between an internally stored expected data message and the incoming data in the remaining subframe before the arrival of the next preamble. The carrier ambiguity detector of the present invention includes a buffer for buffering incoming data, a data memory for storing time-tagged expected data, a data pointer for selecting certain expected data corresponding to a GPS-based time that is synchronized to the incoming data, non-inverting and inverting comparators for comparing the buffered data to the expected data, and a data compare detector coupled to the comparators for indicating a non-inverted or an inverted match for a zero degree or a one-hundred eighty degree resolution, respectively, of carrier phase information.

12 Claims, 3 Drawing Sheets

GPS RECEIVER HAVING FAST RESOLUTION OF CARRIER PHASE AMBIGUITY

This application is a continuation of prior patent application Ser. No. 08/985,476 by McBurney filed Dec. 5, 1997 now U.S. Pat. No. 5,847,680.

BACKGROUND OF THE INVENTION

1. Field of the Invention

The invention relates generally to receivers and more particularly to a GPS receiver having a carrier ambiguity detector for fast resolution of a ½cycle ambiguity in carrier phase during acquisition of an incoming GPS signal.

2. Description of the Prior Art

Global Positioning System (GPS) receivers are commonly used in applications where the GPS signal from one or more GPS satellites is temporarily blocked. For example, a mobile GPS receiver in an automobile may be driven through a location where the line-of-sight to the satellites is blocked by a building or thick foliage. When this happens the GPS receiver will lose lock on the GPS signal. Then, when the line-of-sight is restored, the GPS receiver must go through a set of pre-programmed routines to reacquire the GPS signal and continue with its application. It is desirable for most applications that the GPS receiver reacquire the GPS signal as quickly as possible so that the least operational time is lost.

Existing GPS receivers acquire or reacquire the GPS signal by synthesizing a carrier replica signal and a code replica signal based upon the phase and frequency of a local reference signal. The code replica signal has a one millisecond 1023 bit pseudo-random noise (prn) code matching the prn code of a desired GPS satellite. Carrier and code phase lock loops are used to adjust the phase and frequency of the replica carrier and code signals to match the phase and frequency of the carrier and code of the GPS signal. The GPS receiver is said to have acquired the GPS signal when the correlation between the replica signals and the GPS signal exceeds a predetermined correlation threshold. A pseudorange to the GPS satellite is determined from the phase of code replica signal that causes correlation. An apparent Doppler frequency and a GPS carrier phase observable, called "observable" because it is relative to the phase of the local reference signal, are determined from the adjustment that causes the correlation. The carrier phase observable has a ½cycle ambiguity because either a zero degree or a one-hundred eighty degree phase shift will provide the correlation. The GPS receiver computes its location, velocity, and time from the GPS message data, either received and stored previously or collected in the current GPS signal; and the pseudoranges, apparent Doppler frequencies, and carrier phase observables for typically at least four GPS satellites.

Existing GPS receivers resolve the ½cycle ambiguity by monitoring GPS data until a next preamble is recognized and verified and then detecting whether the preamble is non-inverted or inverted. The ½cycle ambiguity is resolved as zero degrees when data matching the preamble and the correct parity is detected and resolved as one-hundred eighty degrees when data matching an inverted preamble and an inverted parity is detected. Although this approach works, the preamble is only transmitted at about six second intervals so a time delay of about six seconds may be incurred from the time that the GPS signal is acquired or reacquired until the time that the next preamble is received and the ½cycle ambiguity in the GPS carrier phase observable is resolved. In applications such as real time kinematic (RTK) surveying or navigating a vehicle in an urban canyon, such delay in resolving the ½cycle ambiguity is inconvenient. There is a need for the GPS receiver to resolve the ½cycle ambiguity as quickly as possible.

SUMMARY OF THE INVENTION

It is therefore an object of the present invention to provide a carrier ambiguity detector for resolving a carrier phase ambiguity in an incoming signal by detecting a match or an inverted match between internally stored time-tagged expected data and an incoming data message preceding the arrival of the next preamble.

Another object is to provide a GPS receiver using a carrier ambiguity detector for achieving a fast signal acquisition by resolving a ½cycle ambiguity for GPS carrier phase observable information before the arrival of the preamble of the next subframe.

Briefly, in a preferred embodiment, a carrier ambiguity detector of the present invention includes a buffer for buffering incoming data, a data memory for storing expected data, a data pointer for selecting certain expected data corresponding to a time that is synchronized to the incoming data, non-inverting and inverting comparators for comparing the buffered data to the expected data, and a data compare detector coupled to the comparators for indicating a non-inverted or an inverted match for a zero degree or a one-hundred eighty degree resolution, respectively, of carrier phase information for an incoming signal.

An advantage of the present invention is that a carrier phase ambiguity is resolved without waiting for the arrival of a preamble, thereby reducing the time for providing unambiguous carrier phase information.

These and other objects and advantages of the present invention will no doubt become obvious to those of ordinary skill in the art after having read the following detailed description of the preferred embodiments which are illustrated in the various figures.

IN THE DRAWINGS

DETAILED DESCRIPTION OF THE PREFERRED EMBODIMENTS

Figure 1:
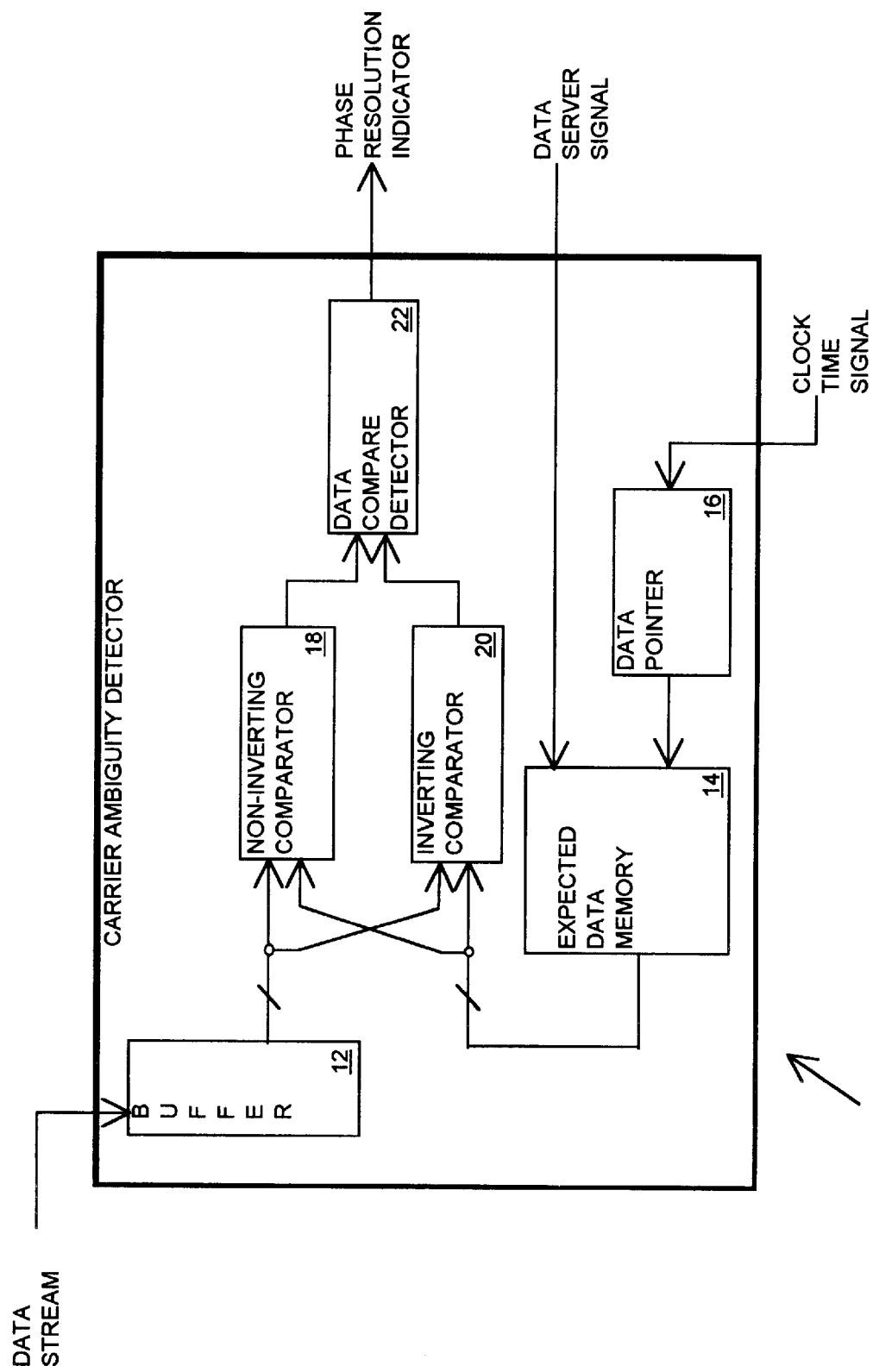
FIG. 1 is a block diagram of a carrier ambiguity detector of the present invention.
Figure 3:
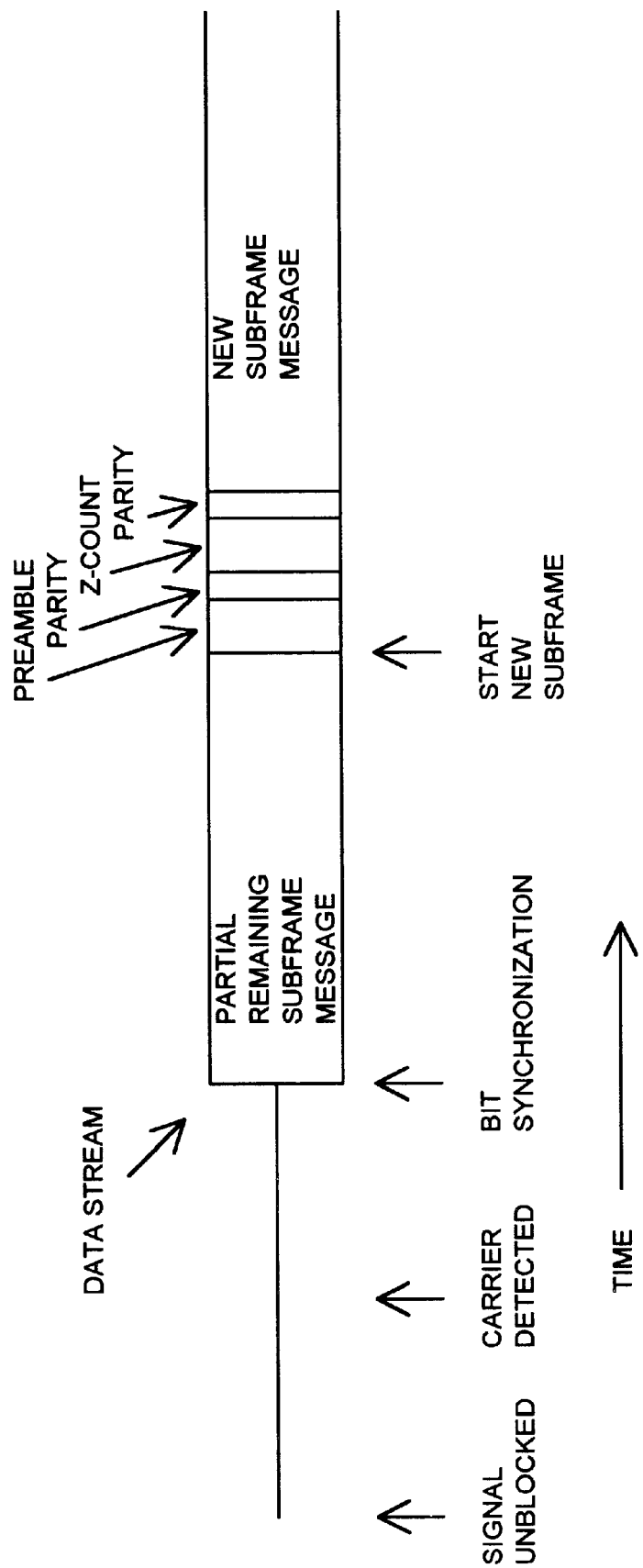
FIG. 3 is a time chart of a data stream received by the carrier ambiguity detector of FIG. 1.

FIG. 1 is a block diagram of a carrier ambiguity detector of the present invention referred to by the general reference number 10. The carrier phase ambiguity detector 10 receives a data stream representative of incoming data that has been demodulated from a multiphase incoming signal where the incoming data is organized into subframes and each subframe includes a fixed preamble followed by a data message. In a preferred embodiment the incoming signal is a global positioning system (GPS) signal where the C/A code incoming data is modulated onto a spread spectrum GPS signal carrier with bi-phase shift key (BPSK) modulation. However, the invention described herein may be used with other systems including the global orbiting navigational system (GLONASS) and higher orders of phase modulation such as QPSK, 8PSK, and beyond or modulations using both amplitude and phase such as QAM. An exemplary data stream for a GPS signal is illustrated in FIG. 3 and described in the accompanying detailed description below. The data stream begins when a carrier of the incoming signal has been detected and data bits of the incoming signal are synchronized. However, due to the phase modulation of the carrier, the phase of the carrier has a ½cycle ambiguity. This ambiguity must be resolved before the carrier phase of the incoming GPS signal may be used for further calculations.

The carrier ambiguity detector 10 includes a buffer 12; an expected data memory 14 having a size of about forty thousand bits; a data pointer 16; a non-inverting comparator 18 and an inverting comparator 20; and a data compare detector 22. The buffer 12 receives sequential bits in a data stream representative of the incoming GPS data in a GPS signal from a particular GPS satellite. The buffer 12 has a capacity of two to thirty-two bits, preferably ten bits, where two bits results in the fastest response and thirty-two bits results minimizes the probability of a false response.

The GPS data is organized in frames having five six-second subframes. Each subframe consists of ten thirty-bit words transmitted at fifty bits per second. Each word contains twenty-four message data bits and six parity data bits. The six parity bits are computed from the twenty-four message bits of a current word and the last two bits of the previous word. The first word in each subframe includes the preamble. The first three subframes in the frame include message data bits of ephemeris information for the precise short-term location-in-space of the GPS satellite transmitting the message. The fourth and fifth subframes include message data bits of almanac information for the long term approximate locations-in-space of all the GPS satellites. Twenty-five frames make a page for transmitting a complete almanac over a twelve and one-half minute period. Further information on the data in the GPS signal is available from the Navtech Book and Software Store in Arlington, Virginia in the "GPS Interface Control Document, ICD-GPS-200" published July, 1991, revised July, 1993, and reprinted February, 1995, or from ARINC in Fountain Valley, California, as "ICD-GPS-200". In a preferred embodiment, the expected data memory 14 includes a capacity for a page of GPS data.

Many of the GPS data bits may be expected either because they do not change frequently or they change in a manner that is predictable. For example, first word in each subframe includes the preamble bit pattern of $8B_h$ that never changes. The second word includes Z-count bits for the GPS-based time when the first bit of the preamble was transmitted by the satellite. The Z-count may be calculated from knowledge of GPS-based time and the transit time from the GPS satellite. Each word includes a six bit parity that may be calculated from the first twenty-four bits of the word and the last two bits of the previous word. The ephemeris information changes only once every four hours and almanac information changes only every half week.

Beginning at midnight Saturday each week, the GPS times at which the pages, frames, subframes, and GPS data bits are transmitted are known from the global positioning system specification. The arrival times of the GPS data may then be determined from the transit time calculated from the location-in-space of the GPS satellite and a previously calculated local location or approximated as seventy-seven milliseconds. The expected data memory 14 receives a data server signal having information for the expected data bits and corresponding GPS-based time tags for the times-of-transmission of the expected data. Such data server signal may be provided by a GPS receiver that has been receiving the GPS signal within the last few tens of minutes and is programmed according to pre-programmed information from the GPS specification. The incoming GPS data bits are time tagged with their times of arrival. The data memory 14 stores the expected data into addresses that correspond to the times-of-arrival of the GPS data bits by offsetting times-of-transmission by the calculated or approximated transit time, thereby enabling the stored data to be accessed by time-of-arrival.

The data pointer 16 receives a clock time signal that is corrected and synchronized to within ten milliseconds or better of GPS-based local time by an operational GPS receiver and issues a pointer for reading the data memory 14 at the addresses having the GPS-timed expected data bits for that GPS time. The non-inverting comparator 18 and the inverting comparator 20 compare the buffered data in the buffer 12 to the GPS-timed expected data in the data memory 14 and issue respective indications to the data compare detector 22 when a match is detected. The data compare detector 22 issues a phase resolution indicator indicating a zero degree resolution of the ½cycle carrier phase ambiguity when the non-inverting comparator 18 detects a match and a one-hundred eighty degree ambiguity when the inverting comparator 20 indicates a match.

The carrier phase ambiguity for modulation formats having a higher order than BPSK may be resolved by buffering multiple channels of incoming data and storing multiple channels of expected data. Each channel of buffered data is then compared to the corresponding channel of expected data with inverting and non-inverting comparators. The carrier phase is resolved when all channels have an inverted or a non-inverted match. For example, for QPSK the buffer 12 includes two buffer areas, one for incoming I data and the other for incoming Q data and the expected data memory 14 stores expected data for both I and Q channels. The carrier phase is then resolved as forty-five degrees when the I non-inverting and Q non-inverting comparators indicate a match; one-hundred thirty-five degrees when the I inverting and Q non-inverting comparators indicate a match, two-hundred twenty-five degrees when the I inverting and Q inverting comparators match, and three-hundred fifteen degrees when the I non-inverting and Q inverting comparators match. The same approach may be extended to N phase modulation or phase and amplitude modulation, such as 16 or 256 QAM, with additional buffer areas, expected data memory, and comparators.

Figure 2:
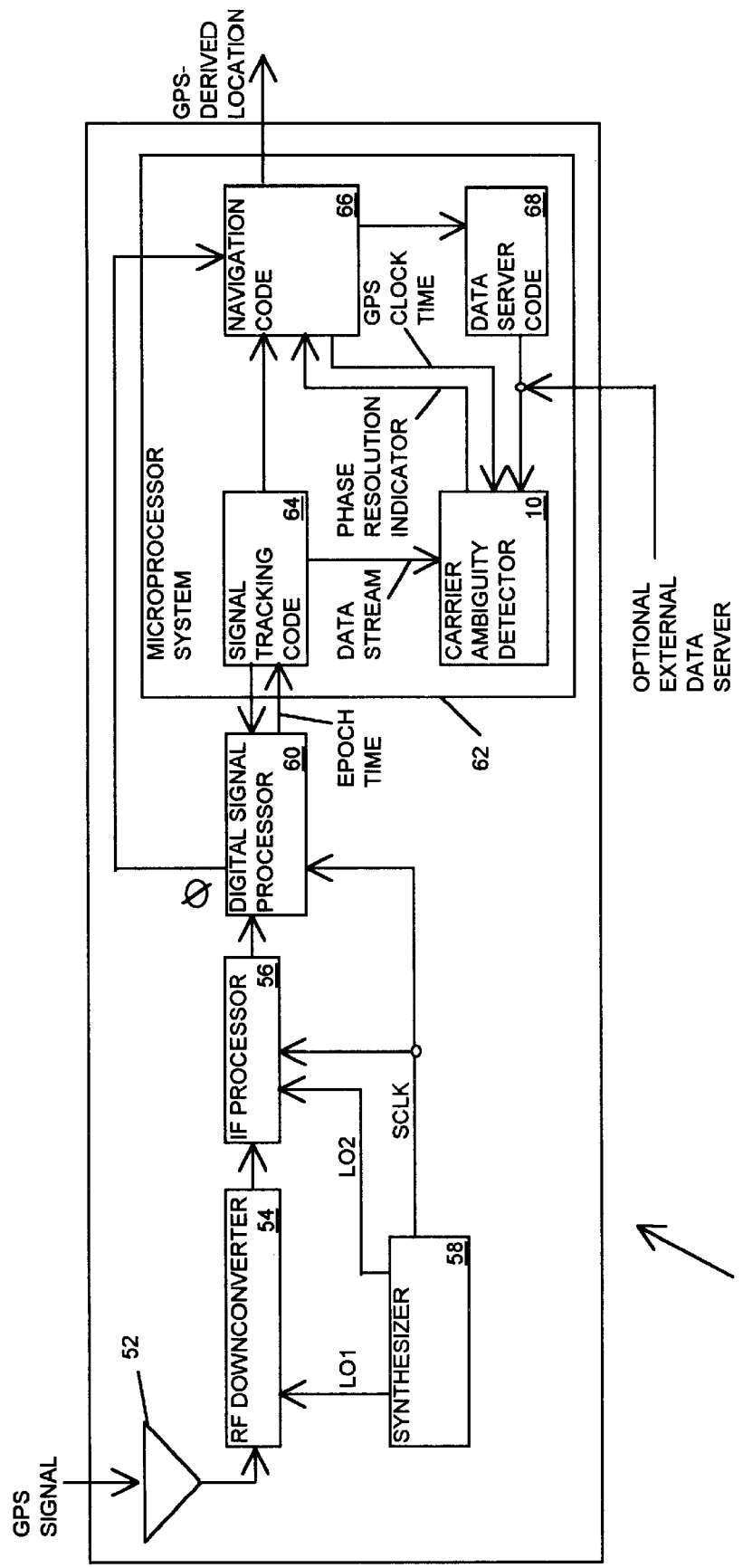
FIG. 2 is a block diagram of a global positioning system (GPS) receiver including the carrier ambiguity detector of FIG. 1.

In a preferred embodiment, the carrier ambiguity detector 10 resides in a GPS receiver such as a GPS receiver of the present invention referred to by the general reference number 50 as illustrated in FIG. 2 and described below in the accompanying detailed description. The GPS 30 receiver 50 includes a microprocessor system 62 including a microprocessor, read only memory, random access memory, a digital signal bus, and associated hardware. A preferred embodiment of the carrier ambiguity detector 10 shares the capability of the microprocessor system 62 with other elements of the GPS receiver 50. The memory of the buffer 12 may be implemented in registers in the microprocessor or included in the random access memory; the expected data memory 14 may be included in the random access memory; and the data pointer 16, the non-inverting and inverting comparators 18 and 20, and the data compare detector 22 may be implemented in executable code stored in the read only memory. Alternatively the data pointer 16, comparators 18 and 20, and data compare detector 22 may use integrated or discrete digital logic hardware, or a combination of hardware and executable code.

FIG. 2 is a block diagram of the global positioning system (GPS) receiver 50 of the present invention including the carrier ambiguity detector 10. The GPS receiver 50 receives an incoming airwave GPS signal at about 1575 MHz with an antenna 52 and passes a conducted GPS signal to a radio frequency (RF) downconverter 54. The RF downconverter 54 uses a first local oscillator signal ($LO_1$) at about fourteen-hundred MHz and passes a downconverted GPS signal to an IF processor 56. The IF processor 56 uses a second 20 local oscillator signal ($LO_2$) at about one-hundred seventy five MHz to further downconvert the GPS signal to a lower frequency and then samples the lower frequency GPS signal with a sampling clock (SCLK) at about three MHz. The $LO_1$, the $LO_2$, and the SCLK are derived in a synthesizer 58 from a reference frequency generated from a single reference oscillator. The sampled GPS signal is received by a digital signal processor 60. The digital signal processor 60 uses the SCLK for deriving several GPS replica signals, each replica signal having a pseudo-random (prn) code that matches the prn code of a desired GPS satellite. Correlators in the digital signal processor 60 compare the sampled GPS signal to the replica signals and provide an in-phase (I) correlation component and a quadrature phase (Q) correlation component corresponding to each of the desired GPS satellites that are received. Either serial or parallel operation is possible for generating the replica signals and performing the correlation, however parallel operation using multiple channels is preferable. Taking one channel or one time period as an example, the I and Q correlation components are passed to the microprocessor system 62. The read only memory in the microprocessor system 62 includes an executable signal tracking code 64, a navigation code 66, a data server code 68, and code for the carrier ambiguity detector 10. The signal tracking code 64 includes instructions directing the microprocessor system 62 to provide a feedback adjustment signal to the digital signal processor 60 to adjust the code and carrier phases of the replica signal until the I correlation component has an absolute value, either a positive or negative, that is greater than a correlation threshold and the Q correlation component has an absolute value, either a positive or negative, that is less than a non-correlation threshold.

The digital signal processor 60 provides an epoch time signal at about a one millisecond period based upon the repetition of the code phase; and carrier phase observable information based upon the phase of the carrier of the replica signal that correlates the replica to the GPS signal. The carrier phase observable is termed "observable" because it is relative to the carrier phase of the locally generated replica signal and because the number of cycles in transit from the GPS satellite is not determined. Further, there is a ½cycle ambiguity in the phase observable until the correct polarity of the I correlation component is determined. The signal tracking code 64 includes a bit synchronization code that uses the epoch time signal to find transitions in the I correlation component that occur at the GPS data rate of fifty bits per second (twenty millisecond periods). When bit synchronization has been determined, the signal tracking code 64 passes the GPS data stream to the carrier ambiguity detector 10. As described above, the carrier ambiguity detector 10 uses information for the expected data received in the data server signal and the clock time signal that is synchronized to GPS time in order to compare the data stream to the expected GPS-timed data and provide a phase resolution indicator to the navigation code 66 indicating a zero degree resolution when the data stream and the expected GPS-timed data have a non-inverting match and a one-hundred eighty degree resolution when the data stream and the expected GPS-timed data have an inverted match.

The signal tracking code 64 uses the I and Q correlation components to provide a pseudo-range, a Doppler frequency shift, and GPS data to the navigation code 66 for each GPS satellite that is tracked. The navigation code 66 uses the pseudo-ranges, Doppler shifts, GPS data, carrier phase observables from the digital signal processor 60, and phase resolution indicator from the carrier ambiguity detector 10 for several, preferably four to eight, GPS satellites for calculating a GPS-based velocity, location, and time. The GPS-based time is passed to the carrier ambiguity detector 10 and the data server code 68 in the clock time signal. The data server code 68 receives the GPS data and the clock time signal for calculating the expected data from the slowly changing and predictable messages in the subframes described above and issuing the time-tagged expected GPS data to the carrier ambiguity detector 10 in the data server signal. optionally the data server signal is provided from an external data server.

FIG. 3 is a time chart of the GPS data stream received by the carrier ambiguity detector 10. At the start of the time chart, the incoming GPS signal from a particular GPS satellite becomes available again after a loss of lock. Typically, a loss of lock can occur due to a cycle slip in a GPS receiver or due to the signal having been blocked for a few seconds or minutes. In the reacquisition of the GPS signal the carrier is detected and the GPS data bits are synchronized enabling the data stream to flow. Typically, the data stream will start in mid-subframe so that the first part of the data stream will be the remaining part of the subframe message that may be up to about six seconds long. When the partial remaining subframe message has completed, a new subframe begins. The new subframe starts with the fixed preamble followed by the first word parity, followed by the Z-count, followed by the second word parity. Prior GPS receivers used the preamble verified by the Z-count and the parities for resolving the ½cycle ambiguity in the carrier phase of the GPS signal. The carrier ambiguity detector 10 of the present invention uses the data in the partial remaining subframe message thereby resolving the ½cycle ambiguity up to about six and one half seconds earlier than the prior GPS receivers.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A receiver having a fast resolution of carrier phase ambiguity of an incoming signal including incoming message data organized for having periodic preambles, comprising:

a memory for buffering expected data that is expected between said preambles in said incoming message data; and a comparator coupled to the memory for comparing said expected data to said incoming message data between said preambles and indicating a first incoming carrier phase when said incoming message data matches said expected data and a second incoming carrier phase when said incoming message data matches inverted said expected data.

2. The receiver of claim 1, wherein:

said expected data includes a data for an expected clock time and said incoming message data includes data for a clock time when said incoming message data was transmitted.

3. The receiver of claim 1, wherein:

the receiver is a global positioning system (GPS) receiver, said incoming signal is a GPS signal, said incoming message data is GPS message date organized into subframes, each said subframe having said preamble.

4. The receiver of claim 3, wherein:

said expected data includes a Z-count for an expected clock time when said GPS message data was transmitted from a GPS satellite.

5. The receiver of claim 3, wherein:

said expected data includes GPS satellite ephemeris information for calculating a precise location-in-space for a particular GPS satellite transmitting said GPS message data.

6. The receiver of claim 3, wherein:

said expected data includes GPS satellite almanac information for calculating approximate locations-in-space for several GPS satellites.

7. A method in a receiver for a fast resolution of carrier phase ambiguity of an incoming signal including incoming message data organized for having periodic preambles, comprising steps of:

storing expected data that is expected to be in said incoming message data between said preambles;

comparing said incoming message data between said subframe preambles to said expected data; and indicating a first incoming carrier phase when said incoming message data matches said expected data and a second incoming carrier phase when said incoming message data matches an inverted said expected data.

8. The method of claim 7, wherein:

said expected data includes a data for an expected clock time and said incoming message includes data for a clock time when said incoming message data was transmitted.

9. The method of claim 7, wherein:

the receiver is a global positioning system (GPS) receiver, said incoming signal is a GPS signal, said incoming message data is GPS message date organized into subframes, each said subframe having said preamble.

10. The method of claim 9, wherein:

said expected data includes a Z-count for an expected clock time when said GPS message data was transmitted from a GPS satellite.

11. The method of claim 9, wherein:

said expected data includes ephemeris information for calculating a precise location-in-space for a particular GPS satellite transmitting said GPS message data.

12. The method of claim 9, wherein:

said expected data includes almanac information for calculating approximate locations-in-space for several GPS satellites.

* * * * *